(12) United States Patent
Li et al.

(10) Patent No.: US 9,886,610 B2
(45) Date of Patent: Feb. 6, 2018

(54) MONOLITHIC INTEGRATED FOCAL ARRAY PLANE AND APPARATUS EMPLOYING THE ARRAY

(71) Applicant: International Business Machines Corporation, Armonk, NY (US)

(72) Inventors: Ning Li, White Plains, NY (US); Devendra K. Sadana, Pleasantville, NY (US); Robert B. Wisnieff, Ridgefield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/604,049

(22) Filed: May 24, 2017

(65) Prior Publication Data

US 2017/0255801 A1 Sep. 7, 2017

Related U.S. Application Data

(63) Continuation of application No. 14/975,719, filed on Dec. 19, 2015, now Pat. No. 9,715,611.

(51) Int. Cl.
*G06K 7/10* (2006.01)
*G06K 7/14* (2006.01)

(52) U.S. Cl.
CPC ....... *G06K 7/10574* (2013.01); *G06K 7/1413* (2013.01)

(58) Field of Classification Search
None
See application file for complete search history.

(56) References Cited

U.S. PATENT DOCUMENTS 9,197,804 B1 * 11/2015 Or-Bach ............ H04N 5/23212
9,715,611 B2 7/2017 Li et al.
2002/0050518 A1 * 5/2002 Roustaei ............ G06K 7/10544
235/454

OTHER PUBLICATIONS

List of IBM Patents or Patent Applications Treated as Related; (Appendix P), Filed Aug. 25, 2017; 2 pages.

* cited by examiner

*Primary Examiner* — Kristy A Haupt
(74) *Attorney, Agent, or Firm* — Cantor Colburn LLP; Louis Percello

(57) ABSTRACT

An optical information detecting apparatus is formed as an integrated, solid state monolithic structure. The monolithic structure includes a plurality of light sensors disposed on a substrate and electrically isolated from one another, a plurality of light emitting elements disposed on the substrate and electrically isolated from one another, the light sensors being optically isolated from the light emitting elements, and a circuit connected to the light emitting elements to generate light towards a target and connected to the light sensors to detect reflected light from the target, wherein a signal is generated in response to the detected light. The signal is indicative of an optical characteristic of the target.

13 Claims, 5 Drawing Sheets

MONOLITHIC INTEGRATED FOCAL ARRAY PLANE AND APPARATUS EMPLOYING THE ARRAY

DOMESTIC PRIORITY

This application is a Continuation of Non-Provisional application Ser. No. 14/975,719, entitled "MONOLITHIC INTEGRATED FOCAL ARRAY PLANE AND APPARATUS EMPLOYING THE ARRAY", filed Dec. 19, 2015 which is incorporated herein by reference in its entirety.

BACKGROUND

The present invention relates to an optical information detecting device having a matrix array of integrated semiconductor elements that are operable in either a photoresponsive or photoemissive mode. The present invention is particularly adapted to improving the performance of optical interfaces, optical transmitters, and image detecting apparatus such as bar code scanners or readers, optical heads, and other optical scanners.

Information of various types may be encoded in graphical form as one or more barcodes, including linear barcodes, in which parallel bars of various widths and spacing may represent encoded information, and matrix (or "two-dimensional") barcodes, in which encoded information may be represented by a two-dimensional pattern of shading (e.g., Quick Response ("QR") codes). Barcodes may typically be configured to be machine-readable, in order to facilitate retrieval and decoding of the information they represent for various purposes. Mobile computing devices and related applications may sometimes provide the capability to capture and/or decode barcodes of various types. For example, a camera-equipped cellular phone may be utilized to capture an image of a barcode (e.g., a QR code) and an internal (and/or remote) application may be utilized to decode the information encoded therein.

Laser barcode scanners were invented several decades ago. The principle of these scanners is to use a laser beam to scan a barcode and then the laser barcode image will be reflected from the barcode to a point-type sensor (such as a photodiode or phototransistor). Then, the reflected laser barcode image is converted into electronic signals which will be decoded by a decoder into numbers and/or characters represented by the barcode.

The original laser light comes from a point-shape laser beam, and so in order to perform the scanning of a barcode, there are two ways: one is moving the laser light by a hand in a scanning light line as shown in FIG. 1; the other is moving the laser light by a mirror as shown in FIG. 2.

Heretofore, it is known that the light source of the barcode scanner is laser diode, the point type expanding light beam passes through a collimating lens and is transferred into a point type parallel light beam and then reaches a target barcode by reflecting the light beam using a mirror. The mirror rotates with a definite angle or vibrates to have the light "point" move from left to right (or from right to left) on the target barcode to scan the barcode, the scanned image is reflected back to a "point type" receiver (photodiode sensor, for example) to detect and decoded by the following electric components. The disadvantage of this design: i.e., to vibrate or rotate a mirror to send out the point type light source; the mirror might not be easy to be adjusted during manufacturing process, the mirror can be tilted or even disordered by collision.

As shown in FIG. 2, the light source structure includes a polygonal mirror 11 having a number of sides, each side of which is an independent mirror, so that the light emitted by laser diode 13 passes through a collimator 14 to be converted into parallel point-shape laser beam to one side of the polygonal mirror 11. Then, the parallel point-shape laser beam will be reflected to the barcode 2 and generate one laser point on barcode, and then the laser point image will be reflected back to the polygonal mirror 11. Thereafter, the reflected laser point image will be reflected again by polygonal mirror 11 and focused to a point-type sensor 15 by a light condensing lens. When the polygonal mirror 11 rotates, all sides of the polygonal mirror 11 will move and change the position and then the parallel point-shape laser beam will be reflected by the mirror at different angles, thereby enabling the parallel point-shape light beam to project on different positions of the barcode, and therefore causing the movement of the laser point. Due to the rapid rotation of the polygonal mirror 11, the reflected laser point will be moved rapidly, thereby producing the scanning effect.

Because of the rapid movement of the polygonal mirror 11 or moving the laser light by hand in a scanning light line as shown in FIG. 1, a linear scanning light will be formed to cover the whole barcode 2, so as to achieve the scanning operation.

The scanners requiring manual movement (See FIG. 1) occupy no more than one percent of the market. The scanners with the rotating mirror or the vibrating mirror (see FIG. 2) occupy the remainder of the laser barcode scanner market. However, the manufacturing cost for the rotating polygonal mirror or the vibrating mirror is expensive, the mirrors can be easily broken and are difficult to manufacture. Furthermore, the light source (13 in FIG. 2) and the sensor array (15 in FIG. 2) are typically disposed on separate circuit boards. That is, current optoelectronic devices used to sense motion or bar codes, for example, but not limited thereto, have separate chips for the light source, detector and processing electronics.

Therefore, it is desired to provide a light source without moving parts and reduce the number of circuit boards for an optical transceiver/optical information detecting apparatus, including a laser barcode scanner, which can obviate and mitigate the above-mentioned drawbacks.

BRIEF SUMMARY

According to one embodiment of the present invention, an optical information detecting apparatus is formed as an integrated, solid state monolithic structure. The monolithic structure includes a plurality of light sensors disposed on a substrate and electrically isolated from one another, a plurality of light emitting elements disposed on the substrate and electrically isolated from one another, the light sensors being optically isolated from the light emitting elements, and a circuit connected to the light emitting elements to generate light towards a target and connected to the light sensors to detect reflected light from the target, wherein a signal is generated in response to the detected light. The signal is indicative of an optical characteristic of the target.

According to an alternate embodiment of the present invention an optical information detecting apparatus comprising an integrated, solid state monolithic structure further comprising a first plurality of substantially coplanar photonic diodes disposed in a matrix array on a substrate and are optically and electrically isolated from one another, a second plurality of light emitting elements that are substantially coplanar and disposed in a matrix array with the first plurality of photonic diodes, a circuit for enabling the diodes to detect light, whereby a signal is generated in response to the detected light, the circuit switchably operates at least one of the photonic diodes to detect light and switchably operates at least one of the light emitting elements to generate light, and a light directing member that directs light that emanates from the light emitting elements to a target and for returning light that contains optical information to the diodes, the light directing member for directing light being external to the solid state monolithic structure. The signal is indicative of an optical characteristic of the target.

According to yet another alternate embodiment of the present invention, a bar code reading apparatus having an integrated, solid state monolithic structure that comprises a plurality of light sensors disposed on a substrate and electrically isolated from one another, a plurality of light emitting elements disposed on the substrate and electrically isolated from one another, the light sensors being optically isolated from the light emitting elements, a circuit connected to the light emitting elements to generate light towards a target and connected to the light sensors to detect reflected light from the target, wherein a signal is generated in response to the detected light, and a light directing member which directs light that emanates from the light emitting elements to the target and returns the light that contains optical information to the light sensors, the light directing member directs light being external to monolithic structure. The signal is indicative of an optical characteristic of the target.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
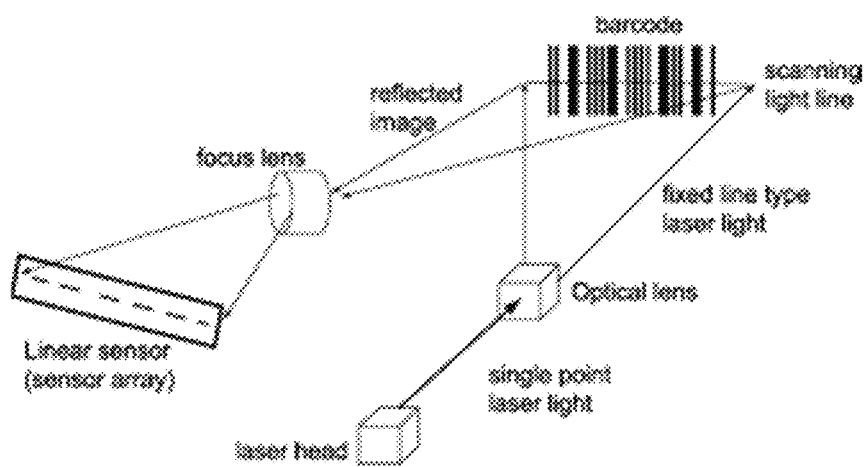
FIG. 1 illustrates a conventional light source structure of a laser barcode scanner.
Figure 2:
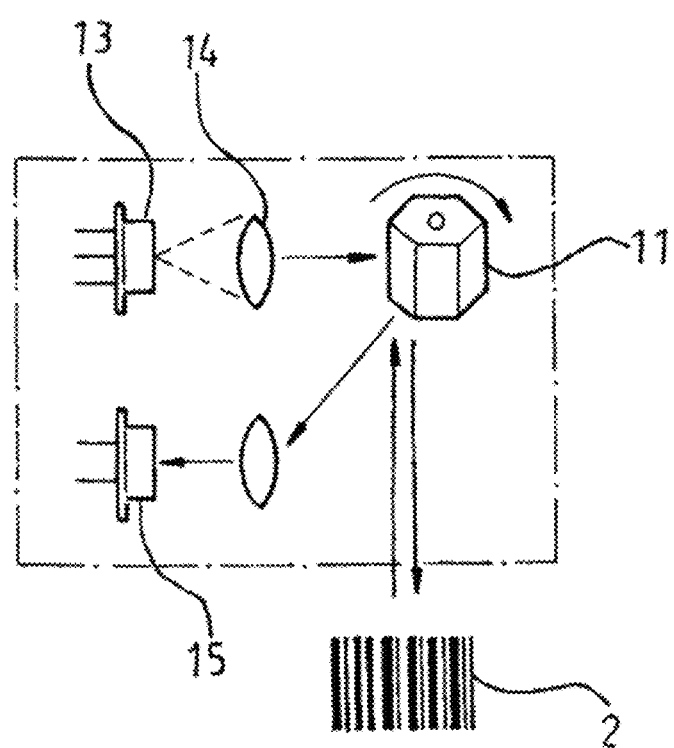
FIG. 2 illustrates another conventional light source structure of a laser barcode scanner.
Figure 3:
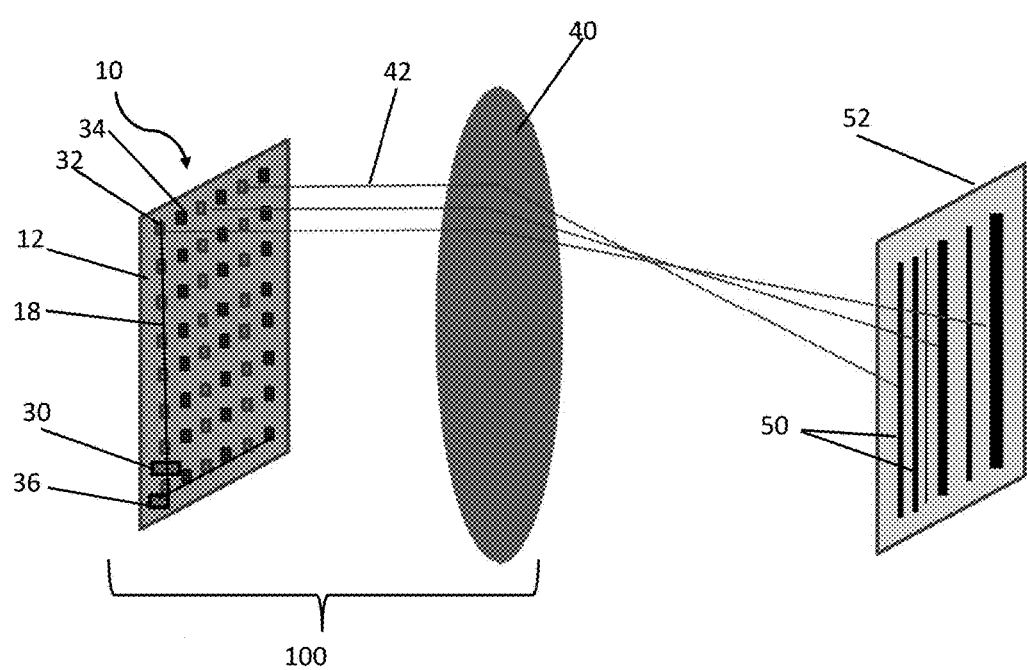
FIG. 3 illustrates a perspective view of an LED and photodetector focal plane array on a single substrate emitting light to scan a barcode through a lens disposed therebetween in an exemplary embodiment.
Figure 4:
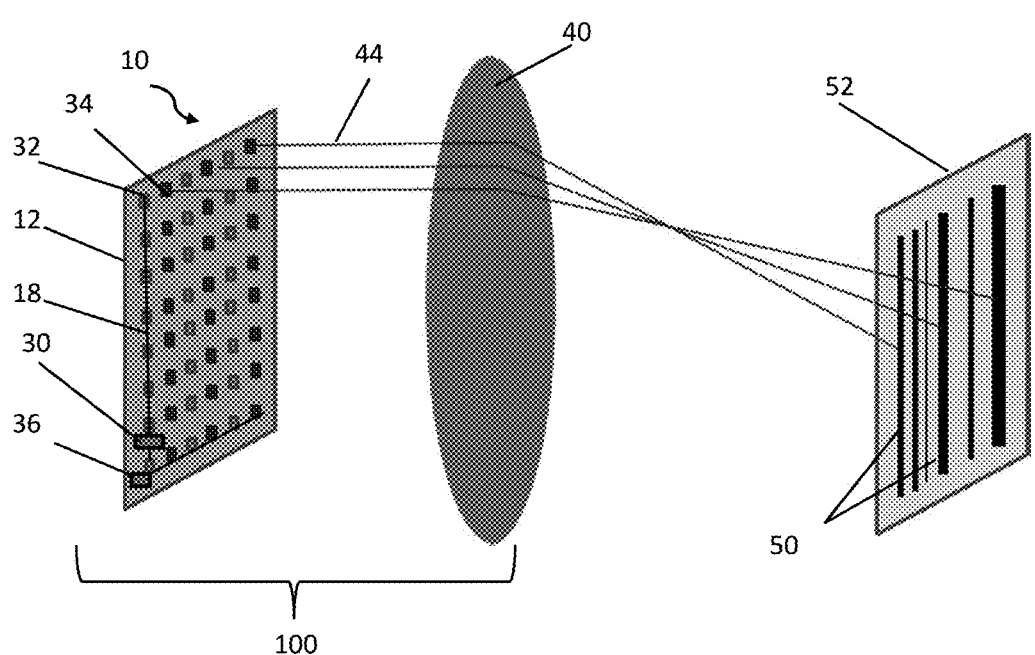
FIG. 4 illustrates a perspective view of the LED and photodetector focal plane array on a single substrate of FIG. 3 receiving reflected light from the barcode through the lens disposed therebetween in an exemplary embodiment.
Figure 5:
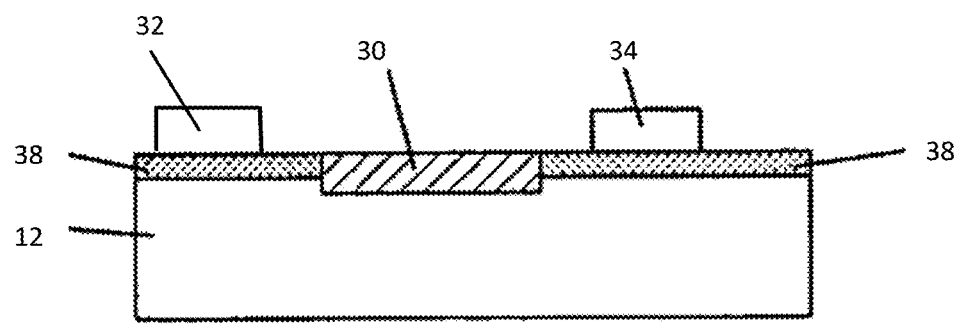
FIG. 5 is a pictorial representation (through a cross sectional view) illustrating a single pixel of a plurality of pixels on the LED and photodetector focal plane array of FIG. 3 illustrating a Ge-on-insulator (GOI) photodetector, monolithically integrated with a Si-containing circuit and light source.

Turning now to the drawings, and in particular to FIGS. 3-5, there is shown a monolithically integrated chip 10 that includes a GOI substrate material (12) of the present invention. The chip 10 comprises a Si-containing, e.g., Si or SiGe, circuits 30 (only one shown in FIG. 3 so as not to obscure the other elements), light sources 32, and GOI photodetectors 34. By monolithically integrating the light sources 32 and photodetectors 34 with the Si-containing circuits 30, the parasitic inductance and capacitance can be reduced as compared with hybrid integration. Additionally, the fabrication of a dense array of detectors and light sources along with corresponding circuits 30 is easy to implement by conventional Si/Ge processing.

In exemplary embodiments, the substrate 12 is an Application Specific Integrated Circuit (ASIC) that is fabricated from the group consisting of: Silicon (Si), Germanium (Ge), Germanium-on-Insulator (GOI), and Gallium Arsenide (GaAs).

In exemplary embodiments, chip 10 is merely exemplary of a large area matrix, having an array of dimensions m×n, where m and n are positive integers, may be used without departing from the spirit of the invention. Neither the array nor the elements thereof are necessarily constrained to a rectilinear configuration.

Chip 10 comprises an array of a plurality light sources 32 and an array of a plurality of detectors 34, each operatively disposed in a two-dimensional, m×n matrix form. Each light source 32 and detector 34 defines a pixel and is interconnected with an associated circuit 30, interconnects those elements to a bus of address lines 18 connecting each element to a processing circuit 36 (see FIG. 3). These buses or lines 18 are formed of an electrically conductive material such as a metal or a thin film conductive oxide. The interconnection functions can be implemented in various forms depending upon the specific system functions desired.

In an exemplary embodiment, each of the detectors 34 is preferably an LED. LED 34 has a well known multilayered structure, and rests on substrate 12. Such an LED can be driven to emit light in response to an electrical signal, and can also produce a detectable electrical signal in response to the absorption of illumination, thus functioning as a photodetector. In the preferred embodiments the detectors 34 are disposed on the same side of substrate 12 so that they are substantially coplanar. Thus the detectors are collocated in a small region, as can be further appreciated with reference to FIG. 3, wherein two neighboring diodes 36 are disposed close together on substrate 12. This arrangement is advantageous in that with appropriate optics (light directing member 40), as might be achieved when the image is out of focus, the field of view of a light source 32 can readily be caused to be substantially coextensive with the field of illumination of a neighboring detector 34. Also if the dimensions of the individual elements as imaged on the indicia substrate 12 are smaller than the substrate diffusion length, then the system will respond as if the two fields of view are substantially coextensive. It will be evident that flood illumination and the detrimental optical effects resulting therefrom can be avoided by disposing the light source 32 with a corresponding detector 34 proximate to each other in view of placement of a light directing member 40 being appropriately placed therefrom for the intended purpose of emitting light 42 from the light source 32 to indicia 50 on a target 52 (FIG. 3). Furthermore, the reflected light 44 from the target 52 is then transmitted through the light directing member 40 and directed to the proper detector 34 neighboring the light source 32 that emitted the initial light 42 toward the target 52 (see FIG. 4).

One problem with optical emitters is that the light produced is uncollimated, that is, it will disperse over some angle. As shown in FIGS. 3 and 4, light directing member 40 is a lens 40 that can be used to produce collimated light 42.

In a preferred embodiment, lens is attached to an epoxy standoff (not shown), for example, but not limited thereto, surrounding the periphery of the array of devices (not shown) on substrate 12. Preferably, the standoff (not shown) maintains lens 40 at a suitable height and may surround and protect the array, preventing the flow of glue or other contaminants onto the array. In practice the smallest distance that would still protect the arrays is the most desirable.

FIG. 5 illustrates a cross section view of one pixel of the matrix array of a plurality of pixels shown in FIGS. 3 and 4. The one pixel of FIG. 5 includes one light source 32 and a neighboring detector 34 on an insulator film 38 between the substrate 12 and the elements 32, 34. The insulator film 38, e.g., buried insulator, may be a mirror stack in other embodiments, depending on the intended purpose of the chip 10. Circuit 30 associated with the elements 32, 34 is shown disposed on the substrate 12 and interposed between the elements 32, 34, but is not limited thereto.

The processing and/or control circuit 36 associated with each of the elements 32, 34, respectively, is utilized to control electrical current through the light and detector array 10 to only predetermined paths using lines 18 so as to facilitate the discrete addressing of each particular optoelectric element 32, 34. The processing and/or control circuit 36 may comprise a current control device, such as a transistor, a threshold switch, an FET, relay, or the like.

In certain applications it may be desired to integrate ancillary electronic circuitry (not shown), such as switches, amplifiers, and the like onto substrate 12. Such circuits may be coupled to the address lines 18 in accordance with the requirements of the application. The details of fabrication of integrated solid state circuits and m×n arrays of both one and two dimensions are well known and need not be further described herein.

It will also be appreciated by those skilled in the art that an optical isolating opaque material may be operatively disposed between the elements 32. 34 to optically isolate the light sources and detectors from one another and substantially reduce optical crosstalk. For example, the insulator 38 in FIG. 5 separates two elements 32, 34.

As previously mentioned, the invention is preferably practiced with a plurality of identically fabricated LEDs that can be tailored to generate charge when absorbing light radiation, and to emit light when an electrical potential is placed across the layers of semiconductor alloy material so as to forward bias the diode.

Each of the elements 32, 34 is coupled to conventional electronic circuitry whereby it can be driven as a light source or can be incorporated in a photodetection circuit whereby an electrical signal is generated in response to light that is detected by the diode 34. Referring now again to FIGS. 3 and 4, there is shown a two-dimensional array of photonic elements 32, 34 that are switchable by the action of a corresponding switch of a corresponding light source circuit 30 and a light sensor circuit 30. When a switch of a corresponding light source/light sensor circuit 30 is not engaged, then the corresponding element 32, 34 is disabled entirely. The corresponding switch 34 of the corresponding circuit 30 can be a mechanical or electronic switch, operable at a required speed, such as a transistor, relay, diode, and the like. Also in some applications the switch may not be required at all, as the photonic elements 32, 34 are connected as sources or detectors to the processing/control circuit 36 via lines 18.

Still referring to FIGS. 3 and 4, there is illustrated an exemplary embodiment of the invention, wherein an exemplary 3×4 integrated array comprises photodiodes 34 that are configured as light sensors, and the light emitting elements are microlasers 32. The photodiodes 34 and lasers 32 are deposited on substrate 12 by methods known to the art, and are electrically isolated from one another by insulator 38 (FIG. 5). Opaque insulating material 38 may be disposed between the photonic elements 32, 34 to prevent optical cross-communication therebetween. The lasers 32 and photodiodes 34 are selectively addressed by address bus 18. The signals are conveyed to processing circuit 36 by signal lines 18. If desired, greater versatility can be achieved by providing each photonic element 32, 34 with a dedicated address line, at a cost in density of component distribution on the substrate or chip 10. Ancillary electronics (not shown) may optionally be provided as discussed above with reference to FIG. 3. The proportion and distribution of the diodes and lasers may be varied in accordance with the needs of the application, the intensity of light emitted by the lasers 32, and the detection capabilities of the light diodes 34. This exemplary embodiment can be advantageously employed where intense, coherent light is required, as in optical interfaces and communicators. It will be appreciated that particular lasers 32 may emit light of differing wavelengths, and that the response of light sensors 34 may be individually matched to lasers 32 within array 10. In this way a plurality of functional subunits (i.e., "pixels") within the matrix can be established, each producing a signal in response to a different optical characteristic or maintaining an individual optical communication channel. Practical uses for such a matrix will be discussed below.

In an exemplary embodiment of the invention depicted in FIGS. 3 and 4, there is illustrated an integrated source-detector array, shown as part of chip 10. Photonic elements comprising light detectors 34 and light sources 32 are shown in an exemplary 3×4 matrix. Light detectors 34 can be p-n diodes, p-i-n diodes, or phototransistors or the like. Light sources 32 are LEDs or lasers. The photonic elements 32, 34 are fabricated on a substrate 10 as explained above with reference to FIGS. 3-5, and can be provided in desired combinations. Each photonic element has its own data line 18 to external circuitry (not shown). As discussed above with reference to FIGS. 3-5, opaque material may be disposed between the photonic elements to prevent optical cross-communication. A proximal end face of a light directing member 40 (e.g., lens 40) is disposed in face-to-face proximity with each of the photonic elements 32, 34. The light directing member 40 may be affixes to the chip 10. In alternate embodiments, the light directing member may include a waveguide, which may be fiberoptic lines, to efficiently transmit light that is emitted from light emitting elements 32 to remote locations and return light from remote locations (e.g., target 532) to light sensor elements 34. Ancillary electronics (not shown) in addition to circuits 30 and 36 may optionally be provided as discussed above.

In FIGS. 3 and 4, an exemplary matrix of light source elements 32 and light detecting elements 34 are disposed on substrate 12 in pairs, ear pair defining a pixel. The proximal plane of a lens 40 is disposed in face-to-face proximity with each pair of photonic elements 3, 34, while the distal plane of the lens 40 faces a remote location or target 52 with indicia. 50. Indicia 50 is a barcode as shown in FIGS. 3 and 4, but is not limited thereto. Light is thereby intercommunicated between the pair of photonic elements 32, 34 and the remote location or target 52. It will also be appreciated that such systems may be further optimized by the use of other optical elements such as lenses and apertures appropriately designed.

The integrated array according to the invention can improve the performance of optical imaging devices. Still referring to FIGS. 3 and 4, there is schematically shown an image detector 100 that incorporates an integrated source-detector array chip 10 including the lens 40 according to the present invention. The embodiments of the matrix discussed above are suitable. Areas on substrate 12 are populated by light emitting and light detecting photonic elements, and comprise functional subunits (e.g., pixels) within the matrix. Light beams, representatively denoted by reference numerals 42, 44, are directed between array chip 10 and target indicia 50 by optics 40. Optics 40 can be a mirror, a lens system, or could be omitted entirely in appropriate applications. While the target 52 is shown as a bar code, it is understood that the device could be designed to read other indicia such as OCR characters, ordinary text, and graphic images. Optics 40 can be designed so that particular regions in which the light emitting and light detecting photonic elements 32, 34 spatially correspond in their fields of view and illumination to limited regions on the target 52 with spatial dimensions less than the diffusion length of the indicia substrate. By choosing suitable optics, light emanating from a particular light emitting photonic element 32 will not flood illuminate the target 52. Control circuit 36 is integrated with the monolithic array chip 10 and coupled to the array of light emitting and light detecting photonic elements 32, 34 and can individually address regions corresponding to specific photonic elements 32, 34 disposed therein. If desired, regions corresponding to individual "pixels" can be permanently connected or spatially or temporally enabled by control circuit 36 so that the instrument reads selective regions on target 52, or sequentially reads a plurality of optical characteristics of the target. It will be recalled that the photonic elements 32, 34 can be tailored to differ from one another in spectral response. This facilitates the reading of more than one optical characteristic of target 52.

Referring once again to FIGS. 3 and 4, when monolithic integrated array chip 10 is constructed in accordance with the embodiments described above, circuits 30 can be operable by a controller such as control circuit 36. When required, control circuit 36 may cause a desired set of photonic elements 32, 34 that are included in each pixel to alternate between a photoemitting and a photodetecting mode so that the instrument can perform optimally under changing conditions. As required in a given application, control circuit 36 integrated with chip 10 may continually enable a set of photonic elements 32, 34 of a pixel in a desired mode.

The signal produced by each of the light sensors 32 can be coupled to signal processing circuitry of the processing/control circuit 36. The signal processing circuitry could include a digitizer in the case of a bar code reader that would convert the signal to bit serial form. In the case of optical information having periodicity, the signal processing circuitry may include a processor adapted to signal processing algorithms as required for interpretation of the optical information that is detected by the matrix of photonic elements 32, 34. The output of the signal processing circuitry may be submitted to any suitable display, storage medium, or to a computer or microprocessor.

As discussed above, the signal processing circuitry may be colocated on substrate 10 with the matrix of photonic elements 32, 34 on the Si or GOI substrate 12. In applications where the signal processing is complex this may be impractical; nevertheless miniaturization may be achieved by placing the signal processing circuitry with the processing/control circuit 36, array of photonic elements 32, 34 and light directing member 40 in a common housing to be implemented as a single monolithic integrated focal plane array module.

In exemplary embodiments as disclosed above, the light emitting elements 32 are selected from a group consisting of: light-emitting-diodes (LEDs), and vertical cavity surface emitting lasers (VCSELs). Likewise, the light sensors/detectors are selected from a group consisting of: photoconducting (PC), and photovoltaic (PV) such as p-i-n photodiodes and metal-semiconductor-metal (MSM) photodetectors. In exemplary embodiments, the detector can be made of Silicon and Germanium as well. However, as will be appreciated by those skilled in the art, other light emitting elements or light sources and light sensors/detectors may be utilized when suitable with the substrate being fabricated from the group consisting of: Silicon (Si), Germanium (Ge), Germanium-on-Insulator (GOI), and Gallium Arsenide (GaAs). In each case, exemplary embodiments include the optoelectronics (light source, detector) and Si circuits on the same chip monolithically (e.g., not packaged or bonded together).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An optical information detecting apparatus comprising:
an integrated, solid state monolithic structure including:
a plurality of light sensors on a substrate and electrically isolated from one another;
a plurality of light emitting elements on the substrate and electrically isolated from one another, the light sensors being optically isolated from the light emitting elements; and
a circuit connected to the light emitting elements to generate light towards a target and connected to the light sensors to detect reflected light from the target, wherein a signal is generated in response to a detected light;
wherein the signal is indicative of an optical characteristic of the target, and
wherein the monolithic structure includes a focal array plane, a plurality of pixels define the focal array plane, and each of the pixels includes one of the light emitting elements and one of the light sensors.

2. The apparatus of claim 1, wherein the circuit selectively addresses each of the light emitting elements.

3. The apparatus of claim 1, wherein the light emitting elements and light sensors are arranged as side-by-side arrays.

4. The apparatus of claim 1, wherein the light emitting elements and light sensors are arranged as two side-by-side arrays.

5. The apparatus of claim 1, wherein:
the light emitting elements are arranged in a first column; and
the light sensors are arranged in a second column.

6. The apparatus of claim 1, wherein:
the light emitting elements are arranged in a first row; and
the light sensors are arranged in a second row.

7. The apparatus of claim 1, wherein the light emitting elements and light sensors are arranged as a matrix array.

8. A bar code reading apparatus comprising:
an integrated, solid state monolithic structure including:
a plurality of light sensors on a substrate and electrically isolated from one another;
a plurality of light emitting elements on the substrate and electrically isolated from one another, the light sensors being optically isolated from the light emitting elements;
a circuit connected to the light emitting elements to generate light towards a target and connected to the light sensors to detect reflected light from the target, wherein a signal is generated in response to a detected light; and
a light directing member which directs light that emanates from the light emitting elements to the target and returns the light that contains optical information to the light sensors, the light directing member being external to the monolithic structure,
wherein the signal is indicative of an optical characteristic of the target, and
wherein the monolithic structure includes a focal array plane, a plurality of pixels define the focal array plane, and each of the pixels includes one of the light emitting elements and one of the light sensors.

9. The apparatus of claim 8, wherein the circuit selectively addresses each of the light emitting elements.

10. The apparatus of claim 8, wherein the light emitting elements and light sensors are arranged as side-by-side arrays.

11. The apparatus of claim 8, wherein the light emitting elements and light sensors are arranged as two side-by-side arrays.

12. The apparatus of claim 8, wherein the light emitting elements and light sensors are arranged as a matrix array.

13. An optical information detecting apparatus comprising:
an integrated, solid state monolithic structure including:
a plurality of light sensors on a substrate and electrically isolated from one another;
a plurality of light emitting elements on the substrate and electrically isolated from one another, the light sensors being optically isolated from the light emitting elements; and
a circuit connected to the light emitting elements to generate light towards a target and connected to the light sensors to detect reflected light from the target, wherein a signal is generated in response to a detected light;
wherein the signal is indicative of an optical characteristic of the target, and
wherein the light emitting elements are arranged in first columns, the light sensors are arranged in second columns, and the first columns alternate with the second columns.

* * * * *